July 21 1925.
C. B. JACOBS
1,546,932
PROCESS OF EXTRACTING ALKALI METAL CYANIDE FROM MASSES CONTAINING
OTHER ALKALI METAL COMPOUNDS SOLUBLE IN WATER
Filed March 11, 1920
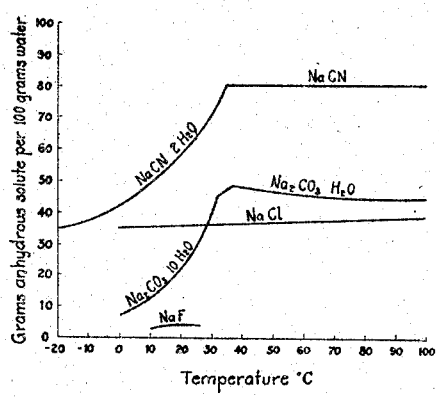
Fig. 1
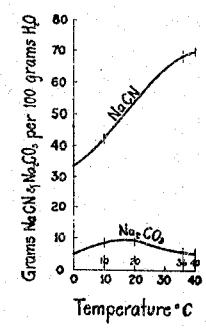
Fig. 3
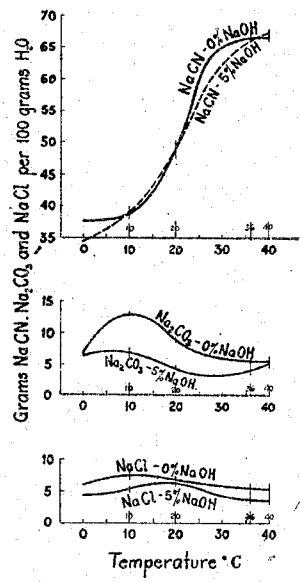
Fig. 2
Fig. 4
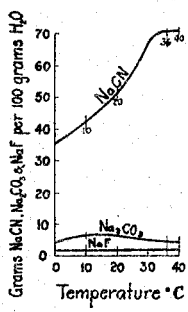
Fig. 5
INVENTOR C. B. Jacobs,
BY J. R. Squair,
ATTORNEY Patented July 21, 1925.

1,546,932

UNITED STATES PATENT OFFICE.

CHARLES B. JACOBS, OF WILMINGTON, DELAWARE, ASSIGNOR TO E. I. DU PONT DE NEMOURS & COMPANY, OF WILMINGTON, DELAWARE, A CORPORATION OF DELAWARE.

PROCESS OF EXTRACTING ALKALI METAL CYANIDE FROM MASSES CONTAINING OTHER ALKALI METAL COMPOUNDS SOLUBLE IN WATER.

Application filed March 11, 1920. Serial No. 365,047.

*To all whom it may concern:*

Be it known that I, CHARLES B. JACOBS, a citizen of the United States, and a resident of Wilmington, in the county of New Castle and State of Delaware, have invented a certain new and useful Process of Extracting Alkali Metal Cyanide from Masses Containing Other Alkali Metal Compounds Soluble in Water, of which the following is a specification.

This invention is in the art of nitrogen fixation and relates more particularly to the extracting of alkali metal cyanides from the masses of alkali metal cyanide, alkali metal carbonate, etc., resulting from those fixation processes wherein free or elemental nitrogen, in a free state or as a constituent of a nitrogen-bearing gas, is caused to combine directly and at high temperature with carbon and a compound of an alkali metal, to form an alkali metal cyanide, the chemical reaction involved being empirically expressed by the equation—

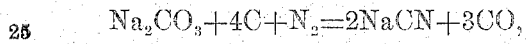

$$Na_2CO_3 + 4C + N_2 = 2NaCN + 3CO,$$

when sodium carbonate is used. Sodium carbonate, on account of its abundance and relatively low cost, is the alkali metal compound usually employed in the production of alkali metal cyanide, and therefore, for definiteness and to most clearly explain my invention, I refer more particularly to sodium carbonate and cyanide; but I do not restrict my invention to the extracting of sodium cyanide.

The furnace product resulting from a fixation process such as that mentioned is not, however, simply the alkali metal cyanide desired as a product, but, rather, it contains a water soluble portion consisting of an intimate mixture of the cyanide, alkali metal carbonate, alkali metal halide, as sodium chloride or fluoride, in cases where it has been used as a catalyzer, and alkali metal oxide (formed by the reduction of the carbonate). On treatment of such a cyanized furnace product with water, there results, in the case where alkali halides are absent, the system NaCN, $Na_2CO_3$, $H_2O$, and NaOH (formed from the oxide present); and in the case, where alkali halides are present, the system NaCN, $Na_2CO_3$, NaOH, $H_2O$, and NaCl or NaF (as the case may be).

Heretofore great difficulty has been experienced in the separation of alkali cyanide in a free state from aqueous solutions, as those indicated just above; for, if a cyanide solution is contaminated by salts other than small quantities of the hydroxide or carbonate of the alkali, the recovery of the cyanide by crystallization is very difficult and in most cases practically impossible (see "Chemistry of Cyanogen Compounds; H. E. Williams, page 302, et seq."). So, the commercially practicable separation of the cyanide from a furnace product of the character indicated has always presented an exceedingly difficult problem. Various methods, in which solvents for the cyanide, other than water, have been used, have been attended with more or less severe losses of expensive solvents and have proved uneconomical and unsatisfactory in commercial practice and the solubilities in water of the cyanide, carbonate, chloride, and fluoride of sodium given in the solubility tables of the literature, and shown by the curves in Figure 1 of the drawings, (the solubility curves all inclining roughly in the same direction, see Figure 1) have made it appear practically hopeless to attempt the separation of sodium cyanide from mixtures with any of the other salts, by extraction with water.

Now I have discovered that, as a matter of fact, water can be satisfactorily and practically used to extract the cyanide from the mass and separate it from the other materials, by dissolving the cyanide and impurities in water and then crystallizing out the cyanide, leaving the impurities in solution; specifically, I have discovered that the concurrent solubilities of the various materials in relatively hot water, and in relatively cold, are such that whereas the cyanide is highly soluble in relatively hot water and much less soluble in relatively cold, the other compounds are less soluble in relatively hot water than in relatively cold. I have provided a process for the extracting of cyanide and based on this discovery, such process giving yields of ultimate finished cyanide amounting to 90 to 95% of the cyanide present in the original furnace product treated, the recovered cyanide being from 96 to 99% pure. This process, stated briefly, comprises treating the furnace product with water at a temperature of about 20° C. or above and preferably at about 36° to 40° C. until a solution saturated with respect to cyanide is obtained, and then cooling the solution to desirably about 10° C. or below to crystallize out the cyanide. Working in this way, the other compounds remain in solution, and, indeed, become more soluble, as the cooling, and the crystallization of the cyanide proceed, and a cyanide of high purity is simply and easily obtained.

Also, I have discovered that a small percentage of alkali metal hydroxide in the water increases the solubility of the cyanide at the higher temperatures and lowers it at the lower temperatures, as compared to the solubility of the cyanide in water not containing hydroxide; while the solubilities of the other compounds are generally decreased somewhat at the higher temperatures, but increase as certain of the lower temperatures are approached.

One object of my invention is to provide a practical and economical process for the production of technically pure alkali metal cyanide from the cyanized furnace product resulting from processes in which free or elemental nitrogen is caused to combine directly with carbon and an alkali metal compound to form an alkali metal cyanide.

Another object is to provide a process for extracting with water alkali metal cyanide from masses containing other alkali metal compounds soluble in water.

To these ends, and also to improve generally on processes of the character indicated, my invention consists in the various matters hereinafter described and claimed.

The accompanying drawings show a series of curves giving the solubilities, in water and as functions of the temperature, of the various compounds to which I more particularly refer, and in these drawings:—

Figure 1 shows the individual solubility curves of sodium fluoride, sodium chloride, sodium carbonate, and sodium cyanide; while the remaining figures show various concurrent solubility curves as follows:—

Figure 2 shows the curves of approximate concurrent solubility of sodium chloride, carbonate, and cyanide in water containing zero grams, and 5 grams, of sodium hydroxide per 100 grams of water;

Figures 3, 4 and 5, show, respectively, the curves of approximate concurrent solubility, in water containing 2 grams of sodium hydroxide per 100 grams of water, of sodium carbonate and cyanide; of sodium chloride, carbonate, and cyanide; and of sodium fluoride, carbonate and cyanide.

The concurrent solubilities shown by the curves of Figures 2 to 5 were selected from solubility data determined by experiment, for the reason that they are typical of the conditions most frequently met with in practice, and, therefore, best illustrate the nature of the invention and its practical application. The solubility determinations were made by adding to a given volume of water a large excess of the mixed salts whose concurrent solubilities it was desired to determine, keeping the solution at the desired temperature by means of a thermostat, and in a state of energetic agitation, and the undissolved salts in a state of continual and homogenous suspension in the solution with efficient mechanical stirrers, until the solution had reached equilibrium—which was determined by withdrawing a sample of the solution in a weighed Lunge acid pipette from time to time until the solution was shown, by check analysis of two samples taken at an interval of two hours, to contain a constant amount of the various salts. I was led to these determinations by knowledge of the fact that water showed a selective solvent action for sodium cyanide in the presence of sodium carbonate and the fact that sodium cyanide depressed the solubility of the sodium carbonate as described in my U. S. Patent No. 1,311,232, granted July 29, 1919.

By these determinations, I discovered, as shown by the typical curves on the drawings, that in each particular case as the temperature rose there was, at a certain temperature, a maximum solubility point for sodium cyanide which coincided very closely with the minimum solubility points of the other salts present, and that as the temperature went down, there was a point reached when the solubility of the sodium cyanide was proportionately lower, and the solubilities of the other salts proportionately higher, than at the higher temperature. Thus I found that it is perfectly possible and wholly feasible to saturate the solution with cyanide at the higher temperature and then obtain pure cyanide by cooling the solution to the lower temperature, at which point a large part of the sodium cyanide crystallizes out of the solution as $NaCN.2H_2O$, while the other salts remain in solution, since their solubilities are greater in a saturated cyanide solution at the lower temperature than they are at the higher temperature.

Not only did I find this to be true in the absence of sodium hydroxide, the curves shown in Figures 3, 4 and 5, though showing the concurrent solubilities in a 2% sodium hydroxide solution (the concentration most frequently met with in practice), being sufficiently close to the curves showing the concurrent solubilities in the absence of sodium hydroxide to serve for determining the conditions of temperature and concentration for extracting technically pure sodium cyanide from a furnace product containing no sodium oxide and which consequently yields a solution containing no sodium hydroxide, but also I found it to be true in the presence of sodium hydroxide through a range of concentrations likely to be met with in practice, as appears directly from the curves.

Thus, although it has previously been believed that, in order to obtain pure cyanide from a mixture containing sodium cyanide, sodium carbonate, and sodium hydroxide, by extraction with water, it was first necessary to add to the water a sufficient amount of sodium bicarbonate to convert the soluble sodium hydroxide present into insoluble (with respect to a saturated sodium cyanide solution) sodium carbonate, and then to separate the solution of sodium cyanide containing only a negligible amount of sodium carbonate from the relatively insoluble residue of sodium carbonate, the fact is, I have discovered, that it is unnecessary to convert the sodium hydroxide into sodium carbonate. Indeed, not only is it unnecessary, but my study of the mutual solubilities of sodium cyanide, sodium carbonate, and also sodium chloride and fluoride in water containing various amounts of sodium hydroxide from 0% up to such concentrations as would be met in practice, shows that the presence of a certain amount of sodium hydroxide is a favorable condition for separating sodium cyanide from mixtures of sodium cyanide, sodium carbonate, and sodium chloride or sodium fluoride.

The effect of sodium hydroxide concentration on the concurrent solubilities of the various salts which would exist with it in solutions of the cyanized furnace products described above is, in the case of sodium chloride, shown in Figure 2. A solution containing sodium chloride was selected as an example of the effect of sodium hydroxide concentration since, on account of its higher solubility in saturated solutions of the other salts, solutions containing sodium chloride might reasonably be expected to be more difficult to separate pure sodium cyanide from than solutions containing sodium fluoride and sodium carbonate, or only sodium carbonate.

An inspection of the curves of Figure 2 shows that with a concentration of 5% of sodium hydroxide, more sodium cyanide and less sodium carbonate and sodium chloride are held in solution at the higher temperatures than is the case where the concentration of sodium hydroxide in the solution is 0. While if the solution be cooled to say 10° C. at which temperature a large portion of the sodium cyanide will be crystallized out as $NaCN-2H_2O$, the solution, even with a concentration of 5% sodium hydroxide, is still capable of retaining more sodium carbonate and sodium chloride in solution than it retained at say 37–40° C., and the sodium cyanide will crystallize out substantially free from the other salts, which latter will remain in the mother liquor.

So, it is quite apparent that a certain concentration of sodium hydroxide is a favorable condition for the extraction of sodium cyanide from cyanized furnace products by this process, since a larger proportion of the sodium cyanide that exists in the solution at the higher temperatures will be obtained by crystallization when the solutions are cooled to the lower temperatures. These same conditions prevail with solutions in which the alkali halide is sodium fluoride or where alkali halides are absent entirely.

In the application of the above solubility data to practice in the extraction and separation of sodium cyanide from other sodium compounds existing with it in cyanized furnace product, after an analysis of the furnace product to determine its composition and relative concentration of the various contained water soluble salts, an inspection of the solubility curves shown in Figures 2 to 5, depending on whether the furnace product, in addition to sodium cyanide, contains sodium carbonate alone or accompanied by sodium chloride or sodium fluoride, will show the temperature at which to leach or extract the furnace product in question, and the amount of water to use in order to obtain approximately the maximum amount of sodium cyanide (and incidentally the minimum amounts of the other compounds) in the resulting solution in order to obtain substantially pure sodium cyanide by crystallization.

As a specific example of working in accordance with my invention, the procedure may be as follows, in extracting sodium cyanide from a furnace product containing sodium cyanide, carbonate, chloride, and oxide (Figure 4): The mass is leached with water at substantially 36° C. until a solution saturated with cyanide is obtained, substantially 100 grams of water per 68 grams of cyanide being used, then the saturated solution is filtered and run into suitable cooling tanks or mechanical crystallizers, and cooled to about 10° C. whereupon substantially pure sodium cyanide is obtained by crystallization.

It is believed unnecessary to cite other specific examples, as, from the curves the procedure in any specific case is evident, it comprising, in general and preferably, leaching with water at substantially the temperature of maximum cyanide solubility until a solution saturated with cyanide is obtained, and cooling to a lower temperature, taking care that the ultimate lower temperature is not such as to bring about the throwing out of solution of the impurities. In cases, as that of carbonate in 5% hydroxide solution, Figure 2, where the solubility of the carbonate at temperatures intermediate the high temperature, and the ultimate low temperature is less than at the latter, the solution may if desired be agitated during crystallization to assist in the redissolving of the carbonate separated at the intermediate temperature. Certain furnace products do not contain impurities in sufficient amount to saturate the amount of water used, as 100 grams per 68 of cyanide, but this presents no difficulty as, with solutions with less impurities than the amount given by the curves, the increasing solubility of the impurities as the temperature decreases, also holds. For maximum yield at crystallization, it is, of course, preferable to work with a saturated cyanide solution, but is not absolutely necessary as, with less than the maximum cyanide and more than the minimum impurities, the solubilities of the impurities increase as the temperature decreases. I prefer not to use a maximum temperature above 40° C., and indeed prefer to use a temperature somewhat below that as, with water above about 40° C. the cyanide tends to hydrolyze and be converted into formate and ammonia.

In the commercial practice of the process, the technical manipulations of the operation may desirably be carried out in any suitably organized system of counter-currentwise leaching apparatus, as for example, a system of apparatus wherein fresh furnace product, at its point of entry, meets an almost saturated solution and is finally exhausted by coming in contact with pure water, having traveled against a current of decreasingly concentrated solution from the point of entry to the point of discharge of the leaching apparatus. In a counter-current process the water, of course, is throughout most of its travel, not saturated with cyanide and therefore may take up more impurities than the saturated solution of cyanide can contain. This merely results in the impurities being deposited as the cyanide content tends to increase, the dissolving action being selective for cyanide.

The length of time of the leaching operation is dependent on the concentration of the sodium cyanide in the furnace product, furnace products rich in sodium cyanide and correspondingly lean in sodium carbonate, sodium oxide, and sodium chloride or sodium fluoride, of course, requiring less time and manipulation to obtain the maximum concentration of sodium cyanide than do products less rich in cyanide and less lean in the other compounds. In any case, the finally resulting saturated solution at the desired temperature is filtered and run into suitable cooling tanks or mechanical crystallizers, and cooled to the temperature at which substantially pure sodium cyanide will be obtained by crystallization, and the impurities will remain in the mother liquor. This mother liquor is either diluted with water and used as make-up solution for reintroduction into the leaching system, or is entered in the leaching system without dilution at a desirable point.

Operating in this manner, or a substantially similar manner, with the proper organization of multiple leaching tanks and circulating pumps, the purity of the finished product is high—from 96–99% NaCN—and the ultimate yield of finished product is from 90–95% of the sodium cyanide present in the original furnace product treated. The over-all loss of sodium compounds is low—from 1 to 2½% of the sodium compounds present in the original furnace product—since all wash waters and solutions are returned to the leaching system as make-up solutions, and the only losses are mechanical, or from handling.

It will be observed by a study of the solubility curves that in certain cases, the crystallization of the cyanide in hydrated form may reduce the water content of the solution to such an extent that it will no longer hold in solution all of the impurities present. In such cases it is advisable to compensate for this by adding, to the solution before crystallizing, water sufficient to keep the impurities in solution.

The sodium hydroxide is by far the most soluble compound present, and although it is usually present in a relatively small amount, it is likely to build up to quite a considerable concentration in the leaching solutions where a number of leaches of furnace products are necessary to sufficiently concentrate the solutions with cyanide for subsequent crystallization, and also in cases where mother liquors are used for make-up solutions in the further leaching of furnace product, since, on account of its extreme solubility, sodium hydroxide always passes on with the leach liquor and is always found with the mother liquor after crystallization. It is, therefore, advisable to prevent the concentration of sodium hydroxide in the leaching liquor from reaching a point, say above 8%, unfavorable to the leaching operation by converting a portion of the hydroxide, from time to time, into sodium carbonate by the addition of the proper amount of sodium bicarbonate to the mother liquor before it is returned to the leaching system, or to the leaching liquor, as desired. Or, alternatively the equivalent quantity of carbon dioxide may be added. The percentage of oxide in a good furnace product is usually so small that in simple leaching, e. g., where a number of leaches of furnace products to build up the cyanide concentration is not made, or where the mother liquor is not used, addition of bicarbonate or carbon dioxide is not called for.

It will be understood that I may depart widely from the composition of the furnace product mentioned above, and that I may apply the process to the extraction of alkali cyanides in general from other alkali compounds, and that I may apply it to the separation of potassium cyanide from other potassium salts or from sodium salts, or to the separation of sodium cyanide from potassium or other alkali salts or mixtures thereof, without departing from the basic principles or scope of the invention, it being merely necessary to establish the approximate mutual solubilities of the particular system in which it is desired to work, and to apply them in the same manner that I have described above for sodium compounds.

It will be seen that the present invention makes possible continuous or counter-currentwise leaching of furnace products, of the character previously mentioned, for the recovery of cyanide by crystallization, and avoids the difficulties inherent in any process that is intermittent in its operation and involves costly evaporation of solutions under a vacuum to obtain pure cyanide, instead of merely the relatively inexpensive crystallization of the present process. Previously, the cyanide has been dissolved away from the accompanying impurities, thereby leaving the cyanide in solution and leaving the impurities behind as a residue; in the present process cyanide and accompanying impurities are dissolved in water, thereby obtaining a solution of the cyanide and the impurities, from which the cyanide is separated in a pure state by crystallization, leaving the impurities in the solution.

I claim:

1. The process of extracting alkali metal cyanide from a mass containing the cyanide and an alkali metal carbonate, which consists in leaching the mass with water at a temperature above 35° C., to dissolve cyanide and carbonate, cooling the resulting solution to a temperature such that the cyanide will crystallize out and the carbonate remain in solution, and separating the cyanide crystals from the mother liquor.

2. The process of extracting alkali metal cyanide from a mass containing the cyanide and an alkali metal carbonate, which consists in leaching the mass with water at a temperature between substantially 36° and 40° C., to dissolve cyanide and carbonate, cooling the resulting solution to a temperature such that the cyanide will crystallize out and the carbonate remain in solution, and separating the cyanide crystals from the mother liquor.

3. The process of extracting alkali metal cyanide from a mass containing the cyanide and an alkali metal carbonate, which consists in leaching the mass with water at a temperature between substantially 36° and 40° C. to dissolve cyanide and carbonate, until a solution substantially saturated with cyanide is obtained, cooling the resulting solution to a temperature such that the cyanide will crystallize out and the carbonate remain in solution, and separating the cyanide crystals from the mother liquor.

4. The process of extracting alkali metal cyanide from a mass containing the cyanide and an alkali metal carbonate, which consists in leaching the mass with water at a temperature between substantially 36° and 40° C. to dissolve cyanide and carbonate, until a solution substantially saturated with cyanide is obtained, cooling the resulting solution to a temperature between substantially 10° and 0° C., and separating the cyanide crystals from the mother liquor.

5. The process of extracting alkali metal cyanide from a mass containing the cyanide, an alkali metal carbonate, and an alkali metal oxide, which consists in leaching the mass with water at a temperature between substantially 36° and 40° C. to dissolve cyanide and carbonate and convert oxide into hydroxide, until a solution substantially saturated with cyanide is obtained, cooling the resulting solution to a temperature such that the cyanide will crystallize out and the carbonate and hydroxide remain in solution, and separating the cyanide crystals from the mother liquor.

6. The process of extracting alkali metal cyanide from a mass containing the cyanide, an alkali metal carbonate, and an alkali metal oxide, which consists in leaching the mass with water at a temperature between substantially 36° and 40° C. to dissolve cyanide and carbonate and convert oxide into hydroxide, until a solution substantially saturated with cyanide is obtained, cooling the resulting solution to a temperature between substantially 10° and 0° C., and separating the cyanide crystals from the mother liquor.

7. The process of extracting alkali metal cyanide from a mass containing the cyanide, an alkali metal carbonate, an alkali metal oxide, and an alkali metal halide, which consists in leaching the mass with water at a temperature above substantially 19° C. to dissolve cyanide, carbonate and halide, and convert oxide into hydroxide, cooling the resulting solution to a temperature such that the cyanide will crystallize out and the carbonate, halide, and hydroxide remain in solution, and separating the cyanide crystals from the mother liquor.

8. The process of extracting alkali metal cyanide from a mass containing the cyanide, an alkali metal carbonate, an alkali metal oxide, and an alkali metal halide, which consists in leaching the mass with water at a temperature above substantially 19° C. to dissolve cyanide, carbonate and halide, and convert oxide into hydroxide until substantially the maximum concentration of the cyanide is obtained in the resulting solution, cooling the resulting solution to a temperature such that the cyanide will crystallize out and the carbonate, halide, and hydroxide remain in solution, and separating the cyanide crystals from the mother liquor.

9. The process of extracting alkali metal cyanide from a mass containing the cyanide, an alkali metal carbonate, an alkali metal oxide, and an alkali metal halide, which consists in leaching the mass with water at a temperature between substantially 36° and 40° C. to dissolve cyanide, carbonate and halide, and convert oxide into hydroxide, until a solution substantially saturated with cyanide is obtained, cooling the resulting solution to a temperature such that the cyanide will crystallize out and the carbonate, halide and hydroxide remain in solution, and separating the cyanide crystals from the mother liquor.

10. The process of extracting alkali metal cyanide from a mass containing the cyanide, an alkali metal carbonate, an alkali metal oxide, and an alkali metal halide, which consists in leaching the mass with water at a temperature between substantially 36° and 40° C. to dissolve cyanide, carbonate and halide, and convert oxide into hydroxide, until a solution substantially saturated with cyanide is obtained, cooling the resulting solution to a temperature between substantially 10° and 0° C., and separating the cyanide crystals from the mother liquor.

11. The process of extracting alkali metal cyanide from a mass containing the cyanide, an alkali metal carbonate, an alkali metal oxide, and an alkali metal fluoride, which consists in leaching the mass with water at a temperature above substantially 19° C. to dissolve cyanide, carbonate and fluoride, and convert oxide into hydroxide, cooling the resulting solution to a temperature such that the cyanide will crystallize out and the carbonate, fluoride, and hydroxide remain in solution, and separating the cyanide crystals from the mother liquor.

12. The process of extracting alkali metal cyanide from a mass containing the cyanide, an alkali metal carbonate, an alkali metal oxide, and an alkali metal fluoride, which consists in leaching the mass with water at a temperature above substantially 19° C. to dissolve cyanide, carbonate and fluoride, and convert oxide into hydroxide until substantially the maximum concentration of the cyanide is obtained in the resulting solution, cooling the resulting solution to a temperature such that the cyanide will crystallize out and the carbonate, fluoride and hydroxide remain in solution, and separating the cyanide crystals from the mother liquor.

13. The process of extracting alkali metal cyanide from a mass containing the cyanide, an alkali metal carbonate, an alkali metal oxide, and an alkali metal fluoride, which consists in leaching the mass with water at a temperature between substantially 36° and 40° C. to dissolve cyanide, carbonate and fluoride, and convert oxide into hydroxide, until a solution substantially saturated with cyanide is obtained, cooling the resulting solution to a temperature such that the cyanide will crystallize out and the carbonate, fluoride and hydroxide remain in solution, and separating the cyanide crystals from the mother liquor.

14. The process of extracting alkali metal cyanide from a mass containing the cyanide, an alkali metal carbonate, an alkali metal oxide, and an alkali metal fluoride, which consists in leaching the mass with water at a temperature between substantially 36° and 40° C. to dissolve cyanide, carbonate and fluoride, and convert oxide into hydroxide, until a solution substantially saturated with cyanide is obtained, cooling the resulting solution to a temperature between substantially 10° and 0° C., and separating the cyanide crystals from the mother liquor.

15. The process of extracting sodium cyanide from a mass containing the cyanide and sodium carbonate, which consists in leaching the mass with water at a temperature above the transition points of hydrated and anhydrous sodium cyanide, to dissolve cyanide and carbonate, cooling the resulting solution to a temperature such that the cyanide will crystallize out and the carbonate remain in solution, and separating the cyanide crystals from the mother liquor.

16. The process of extracting sodium cyanide from a mass containing the cyanide and sodium carbonate, which consists in leaching the mass with water at a temperature between substantially 36° and 40° C. to dissolve cyanide and carbonate, cooling the resulting solution to a temperature such that the cyanide will crystallize out and the carbonate remain in solution, and separating the cyanide crystals from the mother liquor.

17. The process of extracting sodium cyanide from a mass containing the cyanide and sodium carbonate, which consists in leaching the mass with water at a temperature between substantially 36° and 40° C. to dissolve cyanide and carbonate, until a solution substantially saturated with cyanide is obtained, cooling the resulting solution to a temperature such that the cyanide will crystallize out and the carbonate remain in solution, and separating the cyanide crystals from the mother liquor.

18. The process of extracting sodium cyanide from a mass containing the cyanide and sodium carbonate, which consists in leaching the mass with water at a temperature between substantially 36° and 40° C. to dissolve cyanide and carbonate, until a solution substantially saturated with cyanide is obtained, cooling the resulting solution to a temperature between substantially 10° and 0° C., and separating the cyanide crystals from the mother liquor.

19. The process of extracting sodium cyanide from a mass containing the cyanide, sodium carbonate and sodium oxide, which consists in leaching the mass with water at a temperature between substantially 36° and 40° C. to dissolve cyanide and carbonate and convert oxide into hydroxide, until a solution substantially saturated with cyanide is obtained, cooling the resulting solution to a temperature such that the cyanide will crystallize out and the carbonate and hydroxide remain in solution, and separating the cyanide crystals from the mother liquor.

20. The process of extracting sodium cyanide from a mass containing the cyanide, sodium carbonate, and sodium oxide, which consists in leaching the mass with water at a temperature between substantially 36° and 40° C. to dissolve cyanide and carbonate and convert oxide into hydroxide, until a solution substantially saturated with cyanide is obtained, cooling the resulting solution to a temperature between substantially 10° and 0° C., and separating the cyanide crystals from the mother liquor.

21. The process of extracting sodium cyanide from a mass containing the cyanide, sodium carbonate, sodium oxide, and sodium halide, which consists in leaching the mass with water at a temperature above substantially 19° C. to dissolve cyanide, carbonate and halide, and convert oxide into hydroxide, cooling the resulting solution to a temperature such that the cyanide will crystallize out and the carbonate, halide and hydroxide remain in solution, and separating the cyanide crystals from the mother liquor.

22. The process of extracting sodium cyanide from a mass containing the cyanide, sodium carbonate, sodium oxide, and sodium halide, which consists in leaching the mass with water at a temperature above substantially 19° C. to dissolve cyanide, carbonate and halide, and convert oxide into hydroxide until substantially the maximum concentration of the cyanide is obtained in the resulting solution, cooling the resulting solution to a temperature such that the cyanide will crystallize out and the carbonate, halide and hydroxide remain in solution, and separating the cyanide crystals from the mother liquor.

23. The process of extracting sodium cyanide from a mass containing the cyanide, sodium carbonate, sodium oxide, and sodium halide, which consists in leaching the mass with water at a temperature between substantially 36° and 40° C. to dissolve cyanide, carbonate and halide, and convert oxide into hydroxide, until a solution substantially saturated with cyanide is obtained, cooling the resulting solution to a temperature such that the cyanide will crystallize out and the carbonate, halide and hydroxide remain in solution, and separating the cyanide crystals from the mother liquor.

24. The process of extracting sodium cyanide from a mass containing the cyanide, sodium carbonate, sodium oxide, and sodium halide, which consists in leaching the mass with water at a temperature between substantially 36° and 40° C. to dissolve cyanide, carbonate and halide, and convert oxide into hydroxide, until a solution substantially saturated with cyanide is obtained, cooling the resulting solution to a temperature between substantially 10° and 0° C., and separating the cyanide crystals from the mother liquor.

25. The process of extracting sodium cyanide from a mass containing the cyanide, sodium carbonate, sodium oxide, and sodium fluoride, which consists in leaching the mass with water at a temperature above substantially 19° C. to dissolve cyanide, carbonate and fluoride, and convert oxide into hydroxide, cooling the resulting solution to a temperature such that the cyanide will crystallize out and the carbonate, fluoride and hydroxide remain in solution, and separating the cyanide crystals from the mother liquor.

26. The process of extracting sodium cyanide from a mass containing the cyanide, sodium carbonate, sodium oxide and sodium fluoride, which consists in leaching the mass with water at a temperature above substantially 19° C. to dissolve cyanide, carbonate and fluoride, and convert oxide into hydroxide, until substantially the maximum concentration of the cyanide is obtained in the resulting solution, cooling the resulting solution to a temperature such that the cyanide will crystallize out and the carbonate, fluoride and hydroxide remain in solution, and separating the cyanide crystals from the mother liquor.

27. The process of extracting sodium cyanide from a mass containing the cyanide, sodium carbonate, sodium oxide, and sodium fluoride, which consists in leaching the mass with water at a temperature between substantially 36° and 40° C. to dissolve cyanide, carbonate and fluoride, and convert oxide into hydroxide, until a solution substantially saturated with cyanide is obtained, cooling the resulting solution to a temperature such that the cyanide will crystallize out and the carbonate, fluoride and hydroxide remain in solution, and separating the cyanide crystals from the mother liquor.

28. The process of extracting sodium cyanide from a mass containing the cyanide, sodium carbonate, and sodium oxide, and sodium fluoride, which consists in leaching the mass with water at a temperature between substantially 36° and 40° C. to dissolve cyanide, carbonate and fluoride, and convert oxide into hydroxide, until a solution substantially saturated with cyanide is obtained, cooling the resulting solution to a temperature between substantially 10° and 0° C., and separating the cyanide crystals from the mother liquor.

29. The process of extracting alkali metal cyanide from a mass containing the cyanide and an alkli metal carbonate, which consists in leaching the mass with water at a temperature above substantially 19° C. to dissolve cyanide and carbonate, adding water to compensate for water that will be removed from the solution by crystallization of cyanide in hydrated form, cooling the resulting solution to a temperature such that the cyanide will crystallize out and the carbonate remain in solution, and separating the cyanide crystals from the mother liquor.

30. The continuous process of extracting alkali metal cyanide from masses containing the cyanide and an alkali metal carbonate, which consists in leaching masses of successively increasing cyanide strength with a current of water at a temperature above substantially 19° C. and flowing in the direction of increasing cyanide strength in the masses, to dissolve the cyanide and carbonate, cooling the solution flowing from a mass of relatively greater cyanide strength to a temperature such that the cyanide will crystallize out and the carbonate remain in solution, separating the cyanide crystals from the mother liquor, returning the liquor to the system and to a mass of relatively lesser cyanide strength, and repeating the various said steps.

31. The continuous process of extracting alkali metal cyanide from masses containing the cyanide, an alkali metal carbonate, and an alkali metal oxide, which consists in leaching masses of successively increasing cyanide strength with a current of water at a temperature above substantially 19° C. and flowing in the direction of increasing cyanide strength in the masses, to dissolve the cyanide and carbonate, and convert the oxide into hydroxide, cooling the solution flowing from a mass of relatively greater cyanide strength to a temperature such that the cyanide will crystallize out and the carbonate and hydroxide remain in solution, separating the cyanide crystals from the mother liquor, converting a portion of the hydroxide into carbonate, returning the liquor to the system and to a mass of relatively lesser cyanide strength, and repeating the various said steps.

32. The continuous process of extracting alkali metal cyanide from masses containing the cyanide, an alkali metal carbonate, and an alkali metal oxide, which consists in leaching masses of successively increasing cyanide strength with a current of water at a temperature above substantially 19° C. and flowing in the direction of increasing cyanide strength in the masses, to dissolve the cyanide and carbonate, and convert the oxide into hydroxide, cooling the solution flowing from a mass of relatively greater cyanide strength to a temperature such that the cyanide will crystallize out and the carbonate and hydroxide remain in solution, separating the cyanide crystals from the mother liquor, adding sodium bicarbonate to the liquor to convert a portion of the hydroxide into carbonate, returning the liquor to the system and to a mass of relatively lesser cyanide strength, and repeating the various said steps.

33. The process of producing a solution rich in alkali metal cyanide from a mass containing the cyanide and an alkali metal carbonate, which comprises leaching said mass with water at a temperature of from about 36 to 40° C.

34. The process of producing a solution rich in alkali metal cyanide and poor in alkali metal carbonate from a mass containing said cyanide and alkali metal carbonate, which comprises leaching said mass with water at a temperature between about 36 and 40° C.

35. The process of producing a solution rich in alkali metal cyanide from a mass containing said cyanide, an alkali metal carbonate and an alkali metal oxide, which comprises leaching said mass at a temperature between about 36 and 40° C. with water which is initially substantially free from alkali metal bicarbonate 36. The process of extracting sodium cyanide from a mass containing sodium cyanide and sodium carbonate, which comprises leaching said mass with water at a temperature above the transition points of hydrated and anhydrous sodium cyanide.

37. The process of extracting sodium cyanide from a mass containing sodium cyanide, sodium carbonate, and sodium oxide, which comprises leaching said mass at a temperature between 36 and 40° C. with water which is initially substantially free from sodium bicarbonate.

38. The process of extracting sodium cyanide from a mass containing sodium cyanide, sodium carbonate, a sodium halide, and sodium oxide, which comprises leaching said mass at a temperature between 30 and 40° C. with water which is initially substantially free from sodium bicarbonate.

In testimony whereof I affix my signature.

CHARLES B. JACOBS.